(12) United States Patent
Retat et al.

(10) Patent No.: US 8,302,748 B2
(45) Date of Patent: Nov. 6, 2012

(54) MULTI-AXIS SPRING DAMPING SYSTEM FOR A PAYLOAD IN A SPACECRAFT

(75) Inventors: Ingo Retat, Achim (DE); Kiyoumars Abdoly, Bremen (DE); Horst Koehler, Bremen (DE); Wolfgang Tritsch, Bremen (DE)

(73) Assignee: Astrium GmbH, Taufkirchen (DE)

( * ) Notice: Subject to any disclaimer, the term of this patent is extended or adjusted under 35 U.S.C. 154(b) by 307 days.

(21) Appl. No.: 12/387,868

(22) Filed: May 7, 2009

(65) Prior Publication Data

US 2009/0278292 A1 Nov. 12, 2009

(30) Foreign Application Priority Data

May 7, 2008 (DE) .......................... 10 2008 022 467

(51) Int. Cl.
*F16F 7/10* (2006.01)
(52) U.S. Cl. ....................................................... 188/379
(58) Field of Classification Search ............. 267/140.11, 267/140.13, 140.2, 140.4, 141.1, 153, 292, 267/293, 294; 248/562, 575, 577, 618, 635; 411/214, 215, 244; 188/378–380
See application file for complete search history.

(56) References Cited

U.S. PATENT DOCUMENTS

| | | | | |
|---|---|---|---|---|
| 2,689,105 A * | 9/1954 | Zimmer | ......................... | 248/565 |
| 3,107,905 A * | 10/1963 | Lucas | ........................... | 267/161 |
| 3,822,870 A * | 7/1974 | Champleboux et al. | ...... | 267/152 |
| 4,213,718 A * | 7/1980 | Lumby | ......................... | 403/197 |
| 4,252,339 A * | 2/1981 | Shimizu et al. | ......... | 280/124.108 |
| 5,080,335 A * | 1/1992 | Solleder et al. | ............ | 267/141.4 |
| 5,630,575 A * | 5/1997 | Koyanagi et al. | .......... | 267/140.3 |
| 5,743,509 A * | 4/1998 | Kanda et al. | .................. | 248/635 |
| 5,855,463 A * | 1/1999 | Newby | .......................... | 411/244 |
| 6,302,385 B1 * | 10/2001 | Summers et al. | .......... | 267/140.3 |
| 6,609,681 B2 * | 8/2003 | Buder | ............................. | 244/54 |
| 7,011,187 B2 | 3/2006 | Steinbeck | | |
| 7,037,027 B2 | 5/2006 | Steinbeck | | |
| 7,735,812 B2 * | 6/2010 | Fitzgerald | .................... | 267/293 |
| 2006/0202400 A1 * | 9/2006 | Fitzgerald | .................... | 267/293 |
| 2007/0092355 A1 * | 4/2007 | Burger et al. | ................. | 411/535 |
| 2008/0143029 A1 * | 6/2008 | Sato et al. | .................. | 267/141.1 |

FOREIGN PATENT DOCUMENTS

| | | |
|---|---|---|
| DE | 33 33 092 | 3/1985 |
| DE | 102006054274 | 12/2007 |
| GB | 715796 A * | 9/1954 |

* cited by examiner

*Primary Examiner* — Bradley King
*Assistant Examiner* — Vishal Sahni
(74) *Attorney, Agent, or Firm* — W. F. Fasse

(57) ABSTRACT

A multi-axis spring damping element includes two spring damping cushion members received between caps on a bolt shaft, and an axial adjustment mechanism at a free end of the bolt shaft. The other end of the bolt shaft is connected to a support structure, and a load to be supported in a vibration-damped manner is carried by intermediate caps between the two spring damping cushion members. A plurality of such spring damping elements forms a spring damping system, for example for supporting a payload-carrying pallet on a load platform of a spacecraft.

18 Claims, 1 Drawing Sheet

US 8,302,748 B2

MULTI-AXIS SPRING DAMPING SYSTEM FOR A PAYLOAD IN A SPACECRAFT

PRIORITY CLAIM

This application is based on and claims the priority under 35 U.S.C. §119 of German Patent Application 10 2008 022 467.7, filed on May 7, 2008, the entire disclosure of which is incorporated herein by reference.

FIELD OF THE INVENTION

The invention relates to a spring damping element and a spring damping system including a plurality of such spring damping elements, which is especially suited for mounting a payload-carrying pallet, for example on a load platform as a support structure in a spacecraft.

BACKGROUND INFORMATION

In various fields of application, and especially in various transport fields, it is necessary to securely mount a payload to a support structure, such as a support structure of the transporting vehicle. Because of motions, accelerations and vibrations arising during transport of the payload, it is further necessary that such a mounting arrangement is able to provide spring damping of the arising loads, preferably in multiple axes, and especially in three axes. The mounting arrangement thus includes several spring damping elements forming a multi-axis or three-axis spring damping system for mounting the payload in a spring-damped manner relative to a support structure.

A particular field of application of such spring damping systems is for the transport of a payload in a spacecraft, such as a space shuttle, to a space station, for example. In this field of application, the payload is sometimes carried on a standardized load carrier that makes it possible to remove the load unit including the payload and the load carrier out of a space shuttle payload bay with the aid of a robotic arm or the like. In this regard, typically, a payload is mounted on a pallet as the load carrier, and the pallet in turn is screwed to a load platform as a support structure in the payload bay of the space shuttle. The mounting of the pallet is conventionally carried out with a spring damping system interposed between the load and the support structure, for example as disclosed in German Patent Publication DE 10 2006 054 274 B3. That mounting arrangement provides a suppression of rolling motions in two axes, and an independent adaptation of the spring-mounting and damping in all three axes. However, it has been found that the known arrangement of the known spring damping system is relatively complex, cumbersome and costly especially for damping very low frequency vibrations or motions of the received payload, because the known embodiment of the spring damping system is designed to also fulfill further requirements. Therefore, to simply fulfill the multi-axis spring damping requirements, the known mounting system is more complicated and costly than it needs to be.

SUMMARY OF THE INVENTION

In view of the above, it is an object of the invention to provide a spring damping element, and a mounting arrangement and a spring damping system including a plurality of such spring damping elements, which has a simple and economical structure and installation for mounting a second component on a first component in a spring-damped manner. Particularly, a further object of the invention is to provide such a spring damping system by which a pallet carrying a payload can be mounted in a spring-damped manner on a spacecraft's load platform as a support structure, with interposed spring elements for avoiding, damping or reducing the transmission of vibrations or movement loads in a range from middle frequencies to high frequencies in a simple manner. The spring damping system shall especially be suitable and adapted for use in spacecraft and space travel for mounting a payload in a spacecraft. The invention further aims to avoid or overcome the disadvantages of the prior art, and to achieve additional advantages, as apparent from the present specification. The attainment of these objects is, however, not a required limitation of the claimed invention.

The above objects have been achieved according to the invention, in a spring damping element and in a spring damping system comprising a plurality of such spring damping elements. According to the invention, the respective spring damping element comprises a bolt having a bolt shaft secured to and extending from a first component, e.g. a support structure, so that the bolt shaft extends into or through a mounting hole of a second component, e.g. a pallet that carries a payload. The spring damping element further comprises first and second spring damping cushion members arranged in succession one after another on the bolt shaft, as well as first and second receiver caps and first and second intermediate caps also arranged on the bolt shaft. The first spring damping cushion member is received between the first receiver cap and the first intermediate cap, and the second spring damping cushion member is received between the second receiver cap and the second intermediate cap. The first and second receiver caps are arranged axially outwardly opposite one another, while the first and second intermediate caps are arranged axially inwardly adjacent one another, along an axis of the bolt shaft. The mounting hole of the payload-carrying pallet is configured with a counter support therein, for example in the form of a radially inwardly protruding mounting web, flange or rim, which is engaged between the first and second intermediate caps to establish the force-transmitting mounting of the spring damping element to the pallet. Thereby, the force transmission proceeds from the counter support of the pallet into the spring damping element, and from the spring damping element into the support structure, whereby the pallet is mounted to the support structure in a spring-damped manner. The spring damping element further includes an adjustment element such as a threaded nut at an end of the bolt opposite the support structure, such that this adjustment element can adjustingly apply a pre-compression to the spring damping members.

With such a spring damping element, and especially an arrangement of a plurality of such spring damping elements forming a spring damping system that mounts a payload-carrying pallet to a load platform as a support structure, it becomes possible to damp and reduce low frequency oscillating or vibrating loads in three axes, with a very simple structural arrangement of the damping element. Namely, each individual spring damping element provides a resilient damped force transmission in three orthogonal spatial axes (particularly in the axial direction of the bolt shaft and in all radial directions relative to the bolt shaft axis), and additionally in a torsional direction around the bolt shaft axis. A plurality of the damping elements forming the damping system can be mounted with their respective axes all parallel to one another, or with various damping elements oriented in different axial directions to achieve different compound damping effects. The torsional damping of an individual element is generally blocked or checked by the additional mounting of the pallet via additional damping elements on other offset parallel axes or non-parallel axes.

A particularly simple embodiment involves the spring damping cushion members comprising or made of a metal braid material with fibers of wire strands, or stranded wire, or cord strands. Generally, the damping cushion members must comprise an axially and radially yielding or resilient material with a damping effect due to internal friction.

According to a further embodiment of the invention, the intermediate caps that receive the inner ends of the spring damping cushion members and connect the spring damping element to the counter support of the pallet are provided with bolt receiving openings especially in the form of through holes with a larger diameter than the bolt shaft so as to form a radial spacing gap around the bolt shaft. Thereby, a direct contact of the bolt shaft and the intermediate caps is prevented, which ensures the radial spring-damped mounting function, and also facilitates the adjustment. On the other hand, the spring damping cushion members are each provided with a central hole that may fit closely or snugly onto the bolt shaft to ensure a direct radial force transmission between the bolt shaft and the damping member. Alternatively, the spring damping cushion members may have central axial holes larger than the bolt shaft diameter, whereby the radial force transmission is carried out partially by shearing forces through the damping cushion members between the intermediate caps and the receiver caps.

To provide additional pre-stressing or pre-compression of the spring damping element, and to improve the linearity of the response characteristic of the spring damping element by at least partially compensating a non-linearity of the spring damping cushion members, the spring damping element preferably further includes cupped disk springs and disk elements such as spacer disks or washers arranged in series with the spring damping cushion members respectively between the receiver caps and the intermediate caps.

According to a further preferred feature of the invention, the receiver caps and the intermediate caps each comprise an annular disk plate as well as a cylindrical cup wall that receives a respective end portion of the respective spring damping cushion member inserted partially therein. The axial height of the rims or cylindrical cup walls of the receiver caps and the intermediate caps is dimensioned to properly adapt the radial stiffness of the spring damping cushion members to the requirements of the particular application. Namely, the spring damping element will have a greater stiffness of its damping characteristic in the radial direction when the cylindrical cup walls are higher or axially longer, and on the contrary the radial stiffness will be reduced when the cylindrical cup walls have a reduced axial dimension.

BRIEF DESCRIPTION OF THE DRAWINGS

In order that the invention may be clearly understood, it will now be described in detail in connection with an example embodiment according to the invention, with reference to the accompanying drawings, wherein.

DETAILED DESCRIPTION OF A PREFERRED EXAMPLE EMBODIMENT AND BEST MODE OF THE INVENTION

Figure 1:
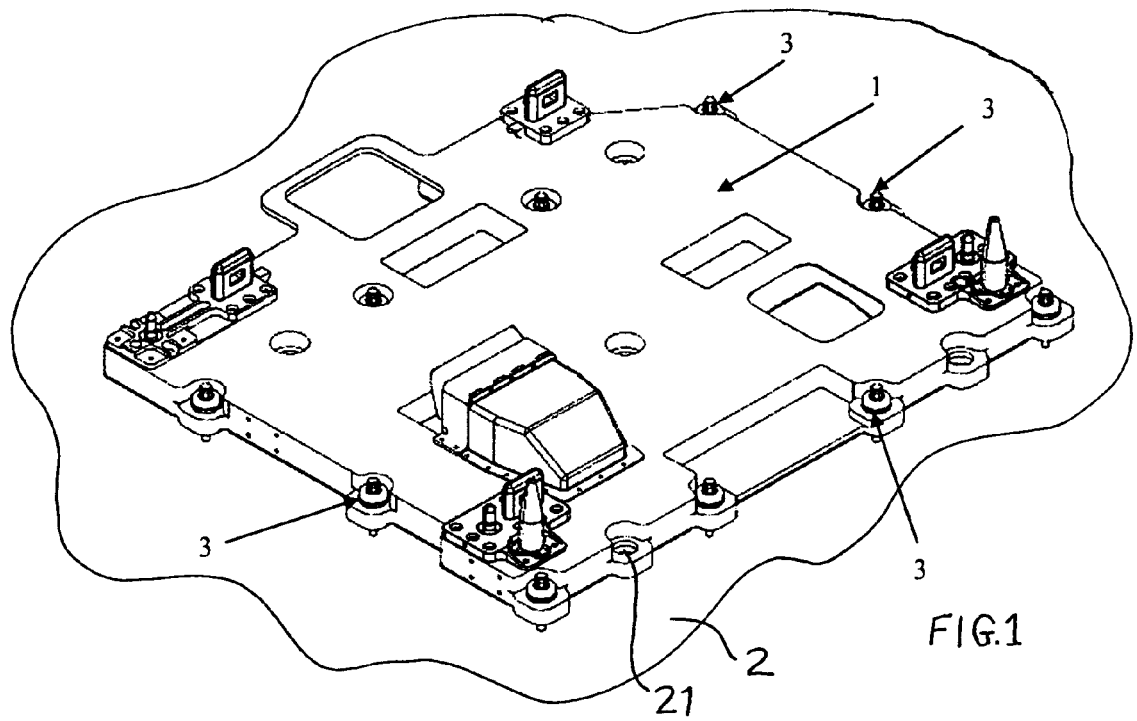
FIG. 1 is a schematic perspective top view of a payload-carrying pallet that is mounted onto a load platform as a support structure, for example in a spacecraft, by plural spring damping elements according to the invention.

A preferred example embodiment of the present invention relates to a spring damping system for damping low frequency vibrations or oscillations in the payload carrying system in a space shuttle. A payload is mounted on or carried by a pallet 1 as shown in FIG. 1, and the pallet 1 is to be mounted on a load platform 2 as a support structure of the space shuttle by a plurality of spring damping elements 3 forming a spring damping system between the payload-carrying pallet 1 and the support structure or load platform 2.

Figure 2:
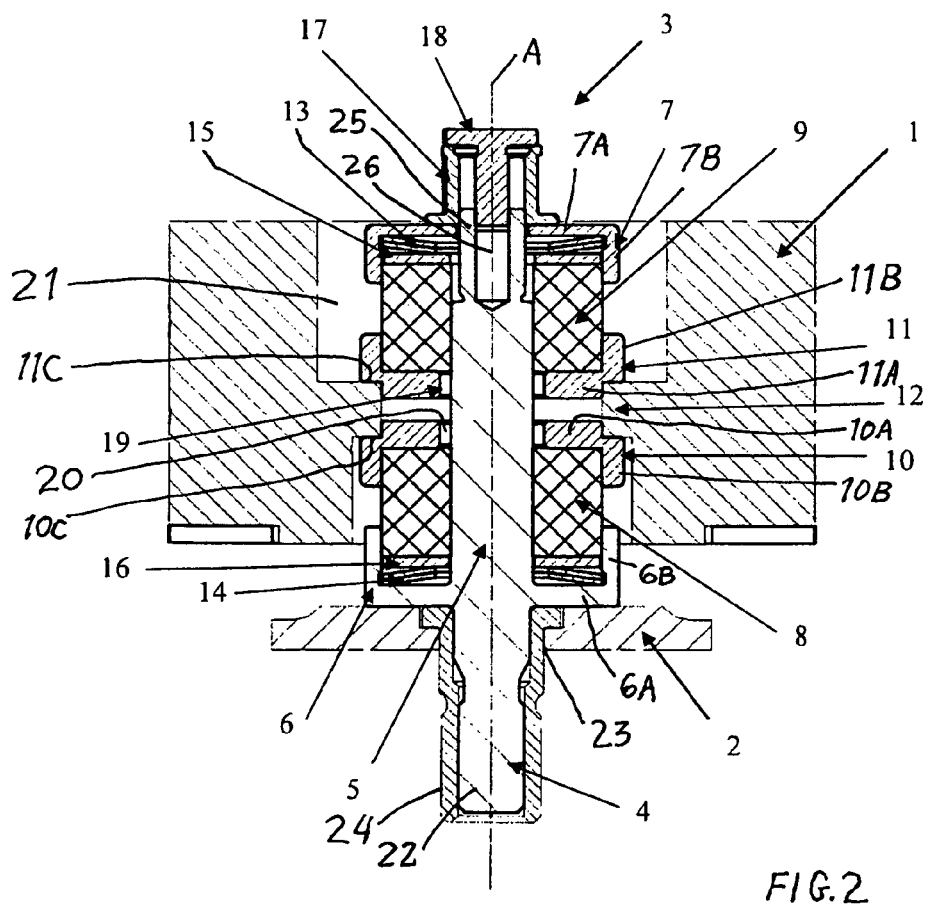
FIG. 2 is a schematic vertical sectional view through one of the spring damping elements according to FIG. 1, installed between the payload-carrying pallet and the load platform or support structure.

As shown in greater detail in FIG. 2, each spring damping element 3 comprises a bolt 4 including a bolt shaft 5 having a first bolt end stub 22 that is received and secured in a mounting hole 23 in the load platform 2, for example with an interposed securing fixture or adapter sleeve 24. This arrangement connects a force output or input end of the spring damping element 3 to the load platform 2. The bolt shaft 5 extends upwardly from the load platform 2 along a longitudinal axis A of the bolt. The spring damping element 3 further includes first and second spring damping cushion members 8 and 9, that each have the shape of an annular cylindrical sleeve of a damping material that is fitted coaxially onto the bolt shaft 5. The first spring damping cushion member 8 is received between a first receiver cap 6 and a first intermediate cap 10. Similarly, the second spring damping cushion member 9 is received between a second receiver cap 7 and a second intermediate cap 11. Thus, the receiver caps 6 and 7 and the intermediate caps 10 and 11 are also arranged coaxially on the bolt shaft 5. The first receiver cap 6 may be fixedly connected to (including e.g. integrally formed in a unitary one-piece manner on) the bolt shaft 5. The second receiver cap 7 and the first and second intermediate caps 10 and 11 each have central axial through holes, through which the bolt shaft 5 passes coaxially. The through holes 19 of the first and second intermediate caps 10 and 11 are preferably sized with a larger inner diameter than the outer diameter of the bolt shaft 5 so as to form a spacing gap 20 radially between the respective intermediate cap 10 or 11 and the bolt shaft 5, as explained above.

The spring damping element 3 further comprises an axial pre-compression and adjustment mechanism, by which the cushion members can be appropriately pre-stressed, i.e. pre-compressed, as will be discussed below. The pre-compression and adjustment mechanism, for example, comprises a threaded pre-compression adjustment nut 17 that is screwed onto an externally threaded end stub 25 of the bolt shaft 5, as well as a threaded locking screw 18 that is screwed into an internally threaded bore 26 in the end stub 25 of the bolt shaft 5. The locking screw 18 and the bore 26 are preferably threaded in the opposite direction relative to the adjustment nut 17 and the externally threaded end stub 25. For example, the adjustment nut 17 has a right hand thread, while the locking screw 18 has a left hand thread. Thereby, once the adjustment nut 17 is adjusted to its proper axial position, and when the locking screw 18 is screwed down tightly against the adjustment nut 17, then an unscrewing or loosening of the adjustment nut 17 and/or of the locking screw 18 is hindered or prevented geometrically, i.e. by the mutual opposite unscrewing directions of the two components 17 and 18. Furthermore, the nut 17 and the screw 18 can be provided with self-locking thread inserts in any conventionally known manner to prevent an unscrewing or loosening of the nut 17 and/or the screw 18.

The spring damping element 3 still further comprises cupped disk springs 13 and 14 as well as washers or spacer disks 15 and 16, with one of each of these preferably respectively interposed between the respective receiver cap 6 or 7 and the respective spring damping cushion member 8 or 9. Alternatively, the disk springs can be arranged adjacent to the intermediate caps rather than the receiver caps for example.

With this construction, it is a simple matter to assemble and install the spring damping element 3, by mounting the bolt 4 in the load platform 2, and then sequentially stacking the several components 14, 16, 8, and 10, and then a counter support 12 of the pallet 1, and then 11, 9, 15, 13, 7, 17 and 18 onto the bolt shaft 5. Particularly, after the first intermediate cap 10 has been placed on the bolt shaft 5, then the pallet 1 is mounted onto the bolt shaft 5 so that the bolt shaft 5 passes into a mounting hole 21 of the pallet 1. The inner wall of the mounting hole 21 is configured with an inwardly protruding counter support 12, for example in the form of an inwardly radially protruding mounting web, rim, flange or bushing 12 that is seated on and engaged with the first intermediate cap 10. Thereafter, the second intermediate cap 11, the second spring damping cushion member 9 and the further components are arranged onto the bolt shaft 5, such that the second intermediate cap 11 is also seated and engaged on the counter support 12 of the pallet 1. Thus, the counter support 12 in the form of a radially inwardly protruding web, flange or rim is received and engaged between the first and second intermediate caps 10 and 11. Other shapes and structures of the counter support 12 are also possible, for example in the form of spokes, pins, shoulders, lips, etc. To facilitate or enhance the engagement of the intermediate caps 10 and 11 with the counter support 12, the intermediate caps 10 and 11 preferably each have a respective mounting shoulder 10C or 11C, for example in the form of an annular shoulder groove around the perimeter of the respective intermediate cap. Thus, the counter support 12 is received and engaged in and between the mounting shoulders 10C and 11C of the intermediate caps 10 and 11. This arrangement connects a force input or output of the spring damping element 3 with the pallet 1. It should be understood that the definitions of the force "input" and the force "output" can be reversed or interchanged, because the spring damping element 3 is effective to damp and isolate vibrations in both directions between the pallet 1 and the load platform 2 or vice versa between the load platform 2 and the pallet 1.

The preferred embodiment of the spring damping element 3 is very simple and economical because it consists of only a few simple readily available or producible components, namely the above discussed components 4, 6, 14, 16, 8, 10, 11, 9, 15, 13, 7, 17 and 18.

Once the spring damping element 3 has been assembled and installed as explained above, to thereby mount the pallet 1 on the load platform 2 via the interposed spring damping element 3, then the spring damping element 3 may be prestressed to appropriately pre-compress the spring damping cushion members 8 and 9. This is achieved by screwing down the pre-compression adjustment nut 17, which axially compresses all the elements between the first receiver cap 6 and the second receiver cap 7, and particularly pre-compresses the cupped disk springs 13 and 14 as well as the spring damping cushion members 8 and 9. Thereby, the screwing adjustment of the nut 17 adjusts or sets the desired pre-compression of the cupped disk springs 13 and 14 as well as the spring damping cushion members 8 and 9. Then the adjusted position of the nut 17 is fixed by countering the nut 17 with the locking screw 18 as discussed above. Also, the appropriate adjustment range can be established with the aid of an appropriate thickness of each one of the washers or spacer disks 15 and 16, i.e. which may be replaced by spacer disks of a different thickness as needed.

In the above described assembled condition, the spring damping element 3 supports the pallet 1 relative to the load platform 2 while damping or isolating vibrations therebetween. For example, the force path from the pallet 1 to the load platform 2 extends from the counter support 12 through the first and second intermediate caps 10 and 11 into the first and second spring damping cushion members 8 and 9, and from there radially into the bolt shaft 5 and/or axially or by shear through the cushion members via the spacer disks 15 and 16 and the cupped disk springs 13 and 14 into the first and second receiver caps 6 and 7, from which the forces are further transmitted into the bolt shaft 5, and then via the bolt end stub 22 to the load platform 2. The force transmission can occur in either direction from a vibration generator or source (either the load platform 2 or the pallet 1) to the other respective component.

For the best force transmission and damping characteristics, each one of the caps preferably has a cup shape with a cylindrical cup wall extending from an annular disk plate to receive a respective end portion of the respective damping cushion member. The first receiver cap 6 includes a cylindrical cup wall 6B extending cylindrically from an annular disk plate 6A. The second receiver cap 7 includes a cylindrical cup wall 7B extending cylindrically from an annular disk plate 7A. The first intermediate cap 10 includes a cylindrical cup wall 10B extending cylindrically from an annular disk plate 10A. The second intermediate cap 11 includes a cylindrical cup wall 11B extending cylindrically from an annular disk plate 11A. Thereby the annular disk plates 6A, 7A, 10A and 11A serve for the axial load introduction and transmission via the damping cushion members 8 and 9, while the cylindrical cup walls 6B, 7B, 10B and 11B radially hold the spring damping cushion members 8 and 9 and serve for the radial force introduction and transmission. The axial length of the cylindrical cup walls 6B, 7B, 10B and 11B can be adjusted or selected to have different axial lengths to thereby influence the radial stiffness of the spring damping element, whereby the stiffness increases when the axial length of the cylindrical cup walls is increased, because thereby the effective free axial length of the interposed spring damping cushion member is reduced.

During operation, radial forces (i.e. forces directed radially relative to the axis A of the bolt 4) are transmitted through both spring damping cushion members 8 and 9. On the other hand, axial forces (i.e. forces parallel to the bolt axis A direction) are transmitted via one of the spring damping cushion members 8 or 9 depending on the direction or sign of the respective axial force. Namely, axial forces tending to lift the pallet 1 upwardly from the load platform 2 will be conducted into and transmitted axially via the second spring damping cushion member 9 to the second receiver cap 7, while axial forces tending to push the pallet 1 downwardly toward the load platform 2 will be conducted into and transmitted axially via the first spring damping cushion member 8 to the first receiver cap 6. Thereby the damping of the axial vibrations occurs predominantly by cyclical vibrating compression of (and internal frictional dissipation by) the respective active spring damping cushion member in the axial direction between the respective intermediate cap and receiver cap.

In this regard, in many cases the above discussed pre-stressing or pre-compressing of the spring damping cushion members 8 and 9 is desired or required in order to prevent the formation of an axial gap between one of the spring damping cushion members 8 or 9 and the corresponding associated intermediate cap 10 or 11 after loading of the spring damping element 3 in the axial direction, for example already due to the weight of the pallet 1 while on earth, or due to any vibrations or oscillations or accelerations of the pallet 1 relative to the load platform 2 during launch of the space shuttle and during transport in space.

The spring damping cushion members 8 and 9 are formed of a somewhat resilient yielding damping material having a characteristic of dissipating vibration energy by internal friction within the respective spring damping cushion member 8 or 9. Preferably, the spring damping cushion members 8 and 9 are formed of a metal braid with fibers of stranded wire or wire strands or suitable cord. Such spring damping cushion members normally have a non-linear progressive spring characteristic or spring function curve, and therefore the spring constant in the axial direction and therewith also the intrinsic or normal oscillation frequency of the system can be adjusted or tuned as required by appropriately adjusting the pre-compression of the spring damping cushion members. For this purpose, the adjustment nut 17 is adjusted as discussed above. In this regard the cupped disk springs 13 and 14 also ensure that no gap will arise between one of the spring damping cushion members 8 or 9 and the corresponding associated receiver cap 10 or 11 after an axial load has been applied to and then discontinued or removed from one of the spring damping cushion members 8 or 9, whereby under some circumstances the respective spring damping cushion member does not return exactly to its initial resting condition but rather remains compressed by a few tenths of a millimeter due to the internal friction of the spring damping cushion member. In this regard, the cupped disk springs 13 and 14 ensure that a sufficient pre-compression is applied to prevent the formation of any such axial gap, i.e. the respective cupped disk spring absorbs or fills any such gap.

Furthermore, the cupped disk springs 13 and 14 preferably have a non-linear degressive spring characteristic function, which can serve to at least partially linearize or improve the linearity of the overall system including the cupped disk springs and the spring damping cushion members. Namely, the variation of the degressive non-linear spring characteristic of the cupped disk springs is preferably opposite or contrary to the variation of the progressive non-linear spring characteristic of the spring damping cushion members, so as to achieve improved linearity of the overall system including the two spring characteristics superimposed on one another. Also, the anti-symmetrical loading of the two spring damping cushion members 8 and 9 in the axial direction already achieves at least a partial linearization. Namely, among the non-linear terms of the spring characteristic function, the even terms of both spring damping cushion members counter or cancel each other out, and only the odd terms remain.

In the radial direction, the force introduction into the spring damping cushion members 8 and 9 occurs via the bolt shaft 5 and the receiver caps 6 and 7. The radially directed force is then transmitted through the spring damping cushion members 7 and 8 via the intermediate caps 10 and 11 to the counter support 12 and thus into the pallet 1. The forces in the radial direction are predominantly or to a large extent transmitted and damped by compression of the spring damping cushion members in the radial direction, and only a small part of the radial force transmission and damping occurs by shear of the spring damping cushion members. This is advantageous, because the load carrying ability of the spring damping cushion members 8 and 9 is smaller for shear loading than for compressive loading. The stiffness of the force transmission characteristic in the radial direction can be influenced by the height or axial dimension of the pressure transmitting elements as explained above.

As discussed above, the magnitude of the pre-stressing can be adjusted by means of the adjustment nut 17. For securing or fixing the adjustment of the nut 17 against loosening due to vibrations or the like, the bolt shaft 5 can be provided with a recess, against which the nut 17 is screwed, and is then secured against loosening due to vibrations by a sufficient pre-tension in the axial direction. A correct spacing distance between the spring damping cushion members 8 and 9, and therewith the pre-compression of the arrangement, can also be adjusted by suitably thick spacer rings provided on the recess of the bolt shaft 5. Alternatively, the spacer rings or spacer disks can be omitted, and it is even possible to omit the cupped spring disks, whereby the spacing distance and thus also the pre-compression is adjusted solely by means of the adjustment nut 17. The shifting or unscrewing of the adjustment nut 17 under vibrational loading is prevented by the counter screw or locking screw 18 as discussed above.

All components of the spring damping element other than the spring damping cushion members may be made of any suitable metal, e.g. any lightweight high-strength metal alloy known in the field of spacecraft transport. Some components, e.g. the cap components, may alternatively be made of fiber reinforced composite materials if suitable for the particular application or use.

In an alternative embodiment, there is an annular gap between the bolt shaft 5 and the damping cushion members 8 and 9 mounted thereon. In other words, the through hole of the cushion members has a larger diameter than the bolt shaft. Thereby, the portion of shear force transmission is increased for transmitting and damping radially directed forces.

In a further alternative embodiment, the position of the fixed receiver cap 6 and the axially movable and adjustable receiver cap 7 is reversed. The adjustment nut is then arranged between the axially movable receiver cap and the load platform. In a further variant, the intermediate caps 10 and 11 are integrated into the counter support 12 of the pallet 1. In other words, the counter support itself extends sufficiently radially inwardly toward the bolt shaft to support the cushion members, and the counter support is configured with two cup shapes like the two intermediate caps in order to receive the cushion members, so that no separate intermediate caps are necessary.

In another embodiment or arrangement, the position and connection of the pallet 1 and the load platform 2 are reversed.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A spring damping element adapted to mount a second component to a first component in a spring-damped manner, comprising:
a bolt that includes a bolt shaft and that is adapted to be secured to the first component;
first and second spring damping cushion members arranged one after another on said bolt shaft, wherein said first and second spring damping cushion members are each respectively a respective circular annular cylindrical sleeve of a damping material bounded entirely by a circular cylindrical outer wall of said damping material that extends axis-parallel, a circular cylindrical inner wall of said damping material that extends axis-parallel, and two circular annular end walls of said damping material that each extend on a respective radial plane, and wherein said first and second spring damping cushion members are each respectively arranged on said bolt shaft coaxially with respect to a longitudinal axis of said bolt shaft;

first and second receiver caps and first and second intermediate caps arranged on said bolt shaft, wherein said intermediate caps and said receiver caps each respectively have a respective cup configuration comprising a respective radially extending disk plate and a respective radially outer cylindrical cup wall extending axially from a radially outer perimeter of said disk plate coaxially around said bolt shaft, said spring damping cushion members are received at least partly in said respective cup configurations and contact said respective radially outer cylindrical cup walls of said intermediate caps and said receiver caps, said first spring damping cushion member is received between said first receiver cap and said first intermediate cap, said second spring damping cushion member is received between said second receiver cap and said second intermediate cap, and said first and second intermediate caps are arranged and adapted to engage a counter support of the second component therebetween;

a first cupped disk spring and a first flat planar washer disk arranged on said bolt shaft and interposed in series together with said first spring damping cushion member between said first receiver cap and said first intermediate cap, and a second cupped disk spring and a second flat planar washer disk arranged on said bolt shaft and interposed in series together with said second spring damping cushion member between said second receiver cap and said second intermediate cap; and an adjustment and pre-compression device that is arranged on said bolt shaft and that has an adjustable axial position along said bolt shaft so as to hold said first cupped disk spring, said first flat planar washer disk, said first spring damping cushion member, said first intermediate cap, said second intermediate cap, said second spring damping cushion member, said second cupped disk spring, and said second flat planar washer disk between said first receiver cap and said second receiver cap on said bolt shaft and so as to adjust and set an axial pre-compression of said first and second spring damping cushion members;

wherein said first and second receiver caps are arranged without or essentially without radial play on said bolt shaft, and wherein said first and second intermediate caps are arranged radially movably with radial play on said bolt shaft, in that said first and second intermediate caps each have a through hole with a larger inner diameter than an outer diameter of said bolt shaft, and said bolt shaft passes through said through holes of said intermediate caps with a radial clearance gap between said inner diameter and said outer diameter and without said spring damping cushion members extending axially into said radial clearance gap.

2. The spring damping element according to claim 1, wherein said bolt shaft includes first and second bolt end stubs at axially opposite ends of said bolt and a main bolt shaft body between said first and second bolt end stubs, said first bolt end stub is adapted to be secured into a mounting hole of the first component so as to secure the bolt to the first component, said adjustment and pre-compression device is axially movably arranged on said second bolt end stub, said first receiver cap is fixedly connected to said bolt shaft on said first bolt end stub or on said main bolt shaft body adjacent to said first bolt end stub, and said second receiver cap is axially movably arranged on said second bolt end stub.

3. The spring damping element according to claim 2, wherein said first and second spring damping cushion members and said first and second intermediate caps are axially movably arranged on said main bolt shaft body.

4. The spring damping element according to claim 2, wherein said second bolt end stub is externally threaded, and said adjustment and pre-compression device comprises an internally threaded nut that is thread-engaged on said second bolt end stub.

5. The spring damping element according to claim 1, wherein said first and second intermediate caps each respectively have a receiving part comprising a shoulder, a rim, a groove or recesses configured, positioned and adapted to receive and engage the counter support of the second component between said receiving parts of said first and second intermediate caps.

6. The spring damping element according to claim 1, wherein said spring damping cushion members each respectively consist of a metal braid material of braided metal wires, fibers or strands.

7. The spring damping element according to claim 1, wherein said spring damping cushion members each respectively have a non-linear progressive spring characteristic and said cupped disk springs each respectively have a non-linear degressive spring characteristic in an assembled installed condition.

8. The spring damping element according to claim 1, wherein said adjustment and pre-compression device comprises an internally threaded adjustment nut threaded onto an externally threaded end stub of said bolt shaft, and an externally threaded locking screw that bears directly against said adjustment nut and that is threaded into an internally threaded hole penetrating axially into an end of said end stub of said bolt shaft.

9. The spring damping element according to claim 1, wherein said spring damping element is adapted to damp vibrations in an axial direction along an axis of said bolt, in all radial directions extending radially from said axis, and rotationally or torsionally around said axis, between the first component and the second component.

10. A spring damping system comprising at least one said spring damping element, said first component and said second component according to claim 1, wherein said bolt shaft is secured to said first component, and said counter support of said second component is engaged by and between said first and second intermediate caps, whereby said spring damping element mounts and connects said second component to said first component.

11. The spring damping system according to claim 10, wherein said at least one spring damping element includes a plurality of said spring damping elements, said first component has a plurality of mounting holes into which said bolts of said spring damping elements are respectively secured, and said second component has a plurality of said counter supports that are each respectively engaged by and between said first and second intermediate caps of respective ones of said spring damping elements.

12. The spring damping system according to claim 10, wherein said first component is a load platform of a spacecraft and said second component is a payload-carrying pallet.

13. The spring damping system according to claim 10, wherein said second component has a mounting hole therein, said counter support comprises a web, flange, rim or shoulder of said second component protruding radially inwardly into said mounting hole, and said spring damping element is received in said mounting hole with a longitudinal axis of said bolt coinciding with an axis of said mounting hole.

14. The spring damping element according to claim 1, wherein said cylindrical inner wall of each one of said spring damping cushion members has an inner diameter matching an outer diameter of said bolt shaft, whereby said spring damping cushion members are fitted directly contacting on said bolt shaft.

15. The spring damping element according to claim 1, wherein said spring damping cushion members are received partly in said cylindrical cup walls of said intermediate caps and extend continuously without gaps or interruptions radially between said cylindrical cup wall and said bolt shaft.

16. The spring damping element according to claim 1, wherein said cylindrical inner wall and said cylindrical outer wall of each one of said spring damping cushion members both have the same axial length and the same axial position as one another.

17. The spring damping element according to claim 1, wherein said first and second receiver caps do not contact each other and are not mechanically stopped axially against each other in an assembled installed condition of said spring damping element.

18. The spring damping element according to claim 1, wherein said first and second receiver caps remain axially movable closer together and farther apart relative to one another responsive to an axial adjustment movement of said adjustment and pre-compression device in an assembled installed condition of said spring damping element.

* * * * *